United States Patent [19]

Veith et al.

[11] 3,806,642

[45] Apr. 23, 1974

[54] DEVICE FOR THE ELECTRONIC RECORDING OF THE INSTANTANEOUS LOCATION OF A SENSING PROBE ON THE SURFACE OF A PLATE

[75] Inventors: Richard Veith; Horst Flake, both of Munich, Germany

[73] Assignee: Siemens Aktiengesellschaft, Berlin and Munich, Germany

[22] Filed: Mar. 30, 1972

[21] Appl. No.: 239,638

[30] Foreign Application Priority Data

Mar. 30, 1971 Germany .......................... 2115367

[52] U.S. Cl. .............................................. 178/18
[51] Int. Cl. .............................................. G08c 21/00
[58] Field of Search ...................................... 178/18

[56] References Cited

UNITED STATES PATENTS

| | | | |
|---|---|---|---|
| 3,684,828 | 8/1972 | Maher | 178/18 |
| 3,134,099 | 5/1972 | Woo | 178/18 |
| 3,657,475 | 4/1972 | Pedonneau | 178/18 |
| 3,618,019 | 11/1971 | Nemirovsky et al. | 178/18 |
| 3,582,839 | 6/1968 | Pim | 310/9.8 |
| 3,562,792 | 6/1968 | Berlincourt | 310/9.7 |
| 3,528,295 | 6/1968 | Johnson | 178/18 |

*Primary Examiner*—Kathleen H. Claffy
*Assistant Examiner*—Gerald Brigance
*Attorney, Agent, or Firm*—Hill, Gross, Simpson, Van Santen, Steadman, Chiara & Simpson

[57] ABSTRACT

A device for the recording of the instantaneous location of a sensing probe such as a pencil or stylus on the surface of a plate, made of piezoelectric material in which mechanical wave fronts are caused to travel in the x- and y- directions for detecting the coordinates of the location of the probe or stylus. Means for producing the mechanical wave trains in the plate are provided at the edges of a predetermined area of the surface of the piezoelectric plate and these means are arranged and directed in such a way that the mechanical wave trains produced in the plate move through the plate in the range of the given surface, in nonparallel directions and disperse practically without echo in acoustic sumps at the opposite sides of the plate. Two adjacent edges of the piezoelectric plate are provided with electrodes on opposite marginal surface portions of the plate, whereby a vibrating electromechanical system is provided in which the portion of the piezoelectric material lying between the electrodes is caused to vibrate mechanically when an alternating voltage is provided to the pair of electrodes located on oppposite sides of the marginal portion of the piezoelectric plate. The scanning probe is a means for sensing the arrival of the wave front produced by each pair of electrodes. Suitable means is provided for electrically pulsing the pairs of electrodes to produce a traveling wave front and means is further provided for measuring the transit time of the pulsed wave from the edge where it is produced to the location on the plate of the probe. The instantaneous position of the probe on the plate is thereby determined. In this new device, an accompaning electrical signal is produced in said plate by the propagating wave. Said electrical signal is received by the electrode of the probe.

15 Claims, 4 Drawing Figures

Fig. la

DEVICE FOR THE ELECTRONIC RECORDING OF THE INSTANTANEOUS LOCATION OF A SENSING PROBE ON THE SURFACE OF A PLATE

CROSS-REFERENCE TO RELATED APPLICATIONS

Cross-reference is made to two related applications filed on the same day as the present application, one of which being an application of Richard Veith, identified in filing as Ser. No. 239,640, and an application of Walter Heywang, indentified as Ser. No. 239,641 both assigned to the same assignee as the present application.

BACKGROUND OF THE INVENTION

1. Field of the Invention

This invention relates in general to a system which is designed to record the movement of a probe or stylus on a plate such, for example, as handwriting, signatures, or line drawings and either reproduce them at the time or store them in a storage memory and reproduce them at a later time.

2. Description of the Prior Art

The broad concept of providing a device for the electronic recording of the instantaneous location of a sensing probe is know.

One system of this type is described in IEEE Transactions on Electronic Computers, October 1964, pp. 609–611. This prior art system comprises means for electrically producing mechanical waves and for coupling said waves into a glass plate, these means being arranged at a pair of adjacent edges of the glass plate. The coupling means are arranged in such a way that they are able to transmit surface waves in orthogonal directions, that is, in the x- direction and y- direction. The mechanical surface waves moving along the surface of the glass plate can be detected by a sensing probe for mechanical sensing said surface waves oscillations. The probe comprises a transducer to change mechanical oscillations picked up from the plate by the tip of the probe into electric signals which, in turn, are fed to an evaluation device which evaluates them.

In this prior art device, the impulse-shaped wave packages of high fequency oscillations, for example, 25 MHz, are coupled into the glass plate sequentially with respect to time for the x- direction and the y- direction, respectively. In this manner each point of the surface through which the two waves move is recorded and precisely located by two coordinates. With the help of the evaluation device, the transit time of each respective wave package from its production until its reception at the location of the probe is detected and registered. From the transit time for wave packages in the x- direction and the transit time for wave packages in the y- direction, the x- and y- coordinates of the instantaneous location of the probe are detected. Means is provided for substantially complete absorption of those wave packages which have crossed the plate and hence no false reading is obtained by a reflected wave.

The sequential timing of the transmission of the wave packages through the plate is effected so rapidly that a movement of the probe, for instance, according to writing speeds for handwritten character patterns, can almost always be followed and recorded.

A piezoelectric sensing system is provided for the probe, as it is applied, for instance, for sound pickups.

Other systems have also been provided in the past for registering the instantaneous position of a probe on a plate such, for example, as provided in a close raster on the surface of the plate made up of crossed, strip-shaped electrodes which are insulated from each other. The resolution power of the device of this character, however, is limited due to the density of the electrode strips.

Still another form of prior art device in this general field is a device which employs a plate with a continuously electrically conductive surface and which has alternating currents fed in at its edges according to a predetermined scheme. The scheme is selected in such a way that due to the potential distribution in the surface each location has a clearly defined alternating potential which can be sensed with the probe. This type of system, however, requires homogeneous conductivity in the surface and an expensive electronic system for feeding and evaluating the detected potentials.

A further similar device provides that surface waves are coupled in x- and y- directions in a glass plate with the help of piezoelectric excitations and the echo is recorded which is returned from the place of the probe. One disadvantage of this system is that the echo which is reflected from a pointed probe has very little energy.

SUMMARY OF THE INVENTION

The present invention relates to a device for electronically registering the instantaneous location of a sensing probe on a predetermined area of the surface of a plate. It is an object of the present invention to improve the reception of mechanical wave signals by a probe, these waves propagating through a plate of such a device. The plate of the device according to the invention is formed of piezoelectric material. It is a further object of the present invention to provide a device having a plate on which the instantaneous position of a probe is to be registered and in which the plate is formed of piezoelectric material and the sensing means are formed in part by the portion of the piezoelectric plate underlying the probe. By said probe electrical signals are directly picked up from said plate. According to a preferred embodiment of the invention, the electromechanical means for producing and coupling of wave trains are formed in part as a portion of the piezoelectric plate.

A still further object of the present invention is to provide a system as above described in which acoustic sumps are provided to absorb traveling waves after they have crossed the plate.

Other objects, features and advantages of this invention will become apparent from the following description taken in conjunction with the accompanying drawings.

BRIEF DESCRIPTION OF THE DRAWINGS

FIG. 1*a* is a partial sectional view of the device of FIG. 1 taken on line B–B′.

DESCRIPTION OF THE PREFERRED EMBODIMENTS

Figure 1:
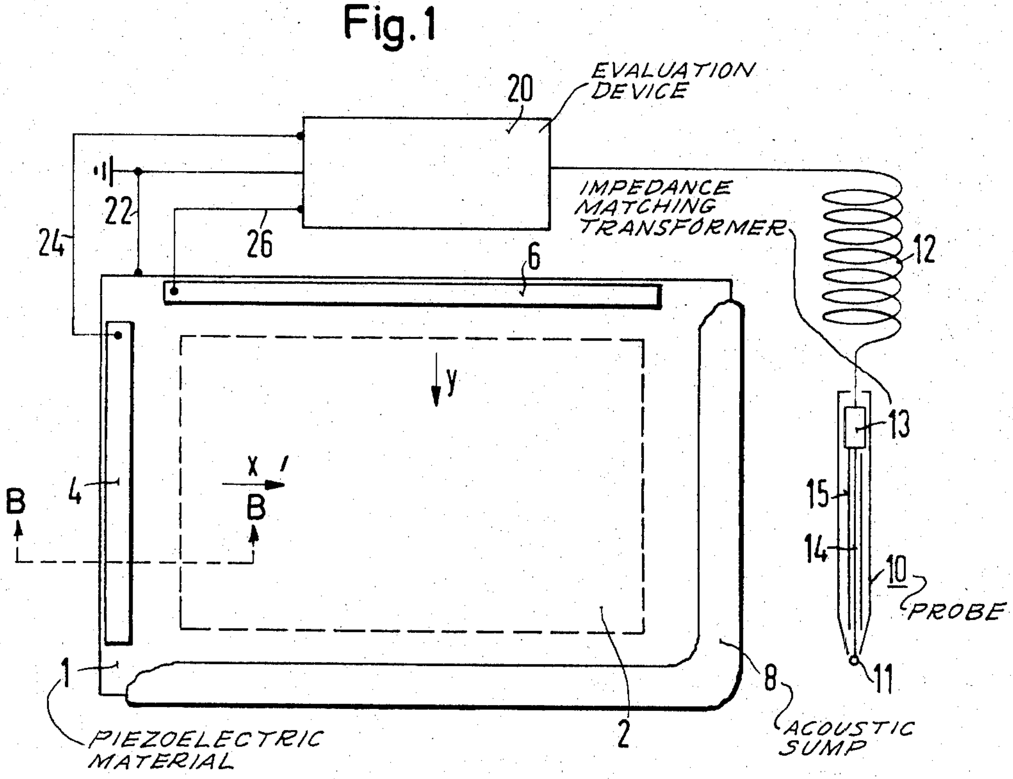
FIG. 1 is a diagrammatic view of a device formed according to the present invention, along with its associated evaluation device and probe.
Figure 1:
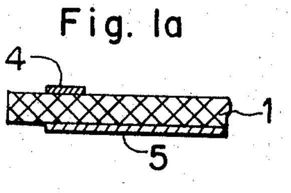

In FIG. 1 of the drawings, a plate 1 is shown formed of piezoelectric material. This plate should be kept so thin that the thickness is small with respect to the width of a strip-shaped wave track which can be produced in the plate.

Strip-shaped electrodes 4 and 6 are provided on two nonparallel edges of a given surface 2 on the plate for the production of the mechanical wave tracks moving through the plate 1 in x- direction and y- direction. Opposite electrodes, in confronting relation to the electrodes 4 and 6 are attached on the back of the plate. When an electric voltage is applied between one of these electrodes and its opposite associated electrode, a piezoelectric effect occurs in the material of the plate. The surface of the opposite electrode 5 on the back is at least approximately as large as the surface of the associated electrode on the front of the plate, and the opposite electrodes may, if desired, be a single electrode 5 covering the entire bottom side of the plate as shown in FIG. *1a*. The opposite electrode 5 is preferably formed on the back of the plate in the manner of an electric coating, for instance, by metalizing on the entire surface. In this embodiment, it furthermore serves as opposite electrode for the probe.

According to a variation of the invention, an electrode and its opposite electrode may be arranged one beside the other, on the same surface of the plate. Heretofore, two or several strip-shaped electrodes are provided which are disposed at a certain distance, parallel to each other.

These electrodes 4 and 6 are preferably arranged at the edge of the plate. In this manner, the wave trains are respectively only propagated in one direction.

Acoustic sumps are provided at the margins of the surface 2 which are opposite from these electrodes 4 and 6 for absorbing the waves traveling through the plate. In the embodiment of the invention illustrated, a coating of these two margins of the plate consisting of a bulge 8 made of artificial resin glue is provided. Such a bulge formed of wave motion dampening material forms an acoustic sump.

It should be noted that the electrodes may be arranged at other inclinations with respect to each other than at right angles.

A sensing probe 10 is provided which is electrically connected through a flexible line 12 to an evaluation device 20 whose inner construction is known in principle and which, correspondingly, is merely schematically indicated in the figure. The electrodes 4 and 6 and their associated electrodes or electrode are arranged to be electrically energized from the evaluation device by means of lines 24, 26 and 22.

The mode of operation of the device according to this invention is the following. Electric voltage impulses are applied between the electrodes 4 or 6, respectively, and their associated opposite electrode, on a time sequential basis. Preferably, rectangular voltage impulses are provided. These voltage impulses cause piezoelectrically produced mechanical oscillation impulses in the region of the electrode strips 4 and 6, i.e., short mechanical wave trains in the material of the plate between the respective electrode strips and their opposite electrode. Preferably, the electrodes 4 and 6 are several times wider than the thickness of the plate 1, and preferably two to three times broader.

According to a further development of the invention, the duration of a rectangular voltage impulse, tuned to the width of the electrodes 4 or 6, respectively, is preferably selected so large that the mechanical wave trains which are produced by this impulse in the material of the plate consist mainly of a single oscillation. This selection of electrode widths and duration of the electrical impulse results in an optimum degree of coupling. As compared with the state of the art, it is possible to operate with a wave train whose essential frequency portion is essentially lower, i.e., is about 1 MHz, with the device according to this invention.

Due to the longitudinal shape of the electrodes, these produced wave trains expand throughout the plate with an essential straight-line wave front which is parallel to the longitudinal extension of the respective electrode strip. A wave train in the x- direction proceeds from the electrode 4, and a wave track in the y- direction proceeds from the electrode 6. As has been mentioned above, these wave trains are practically completely absorbed in the acoustic sump 8 after they have traveled through the surface 2. With a thickness of the plate between 0.1 and 1 mm, in particular of about 0.3 mm, it is desirable to provide an electrode width of 0.2 to 3 mm, preferably of 1 mm. For this dimensioning example, essentially rectangular voltage impulses with a duration of about 0.5 $\mu$ sec have proven to be particularly advantageous. With such impulses, impulse-shaped wave trains can be produced in the plate which result in a strong piezoelectric signal which can be reliably scanned.

Due to the piezoelectric property of the entire plate, a corresponding strip-shaped piezoelectric voltage production travels through the volume of the plate, together with each mechanical wave train.

An interfering broadening of the mechanical wave train can occur due to reflection at the respective plate edge, adjacent to the electrode. Since such broadening is not prevented by sufficient proximity of the electrode to the respective edge, it is desirable also to provide an acoustic sump corresponding to 8 at those respective margins of the plate.

When the tip 11 of electrically conductive material of the scanning probe 10 is in galvanic or capacitive contact with the surface of the plate in the region of the surface 2, the piezoelectrically produced voltages of the mechanical wave trains traveling in the material of the plate in x- and y- directions can be sensed. The opposite electrode thereby has the effect of an opposite pole for the tip 11 connected with the evaluation device by means of the conductor 12.

The signal voltage produced by the mechanical waves can be sensed from the surface of the piezoelectric plate 1.

According to the present invention, the writing on a sheet of paper and the sensing of the character pattern which is being applied to this sheet of paper is accomplished by a galvanic or capacitive sensing probe. The probe may also be a writing pen, for example, a ball point pen. The signals which are produced piezoelectrically in the plate by the above-stated mechanical wave trains, are such that they can be capacitively recorded by the probe through a sheet of paper resting on the plate.

The volume waves, provided according to a preferred embodiment of the invention, are advantageously not essentially dampened by the application of a sheet of paper on the surface of the plate. Furthermore, the volume waves are also not influenced in an interfering manner by impurities on the plate surface, for instance, finger prints or by the outer pressure on the plate, for instance, by the application of the hand. This is also true for the above-stated thin plates and for short wave-trains which are to be preferred for obtaining a high power of resolution. For adapting the coupling capacitance between the probe and the surface of the plate to the connection line 12, an impedance transformer 13 is inserted in the sensing probe. The latter consists of an electronic circuit with a field-effect transistor. In order to reduce the capacity of the feed line 14 between tip and impedance transformer, a so-called swimming shield is provided which is coupled with the feed line 14 via the resistance of the ink in the sensing probe which is designed as a pen.

Preferably, barium titanate, lead-zirconium titanate, or other corresponding piezoelectric-ceramic materials are provided as material for the plate 1, possibly with additions.

Figures 2, 3:
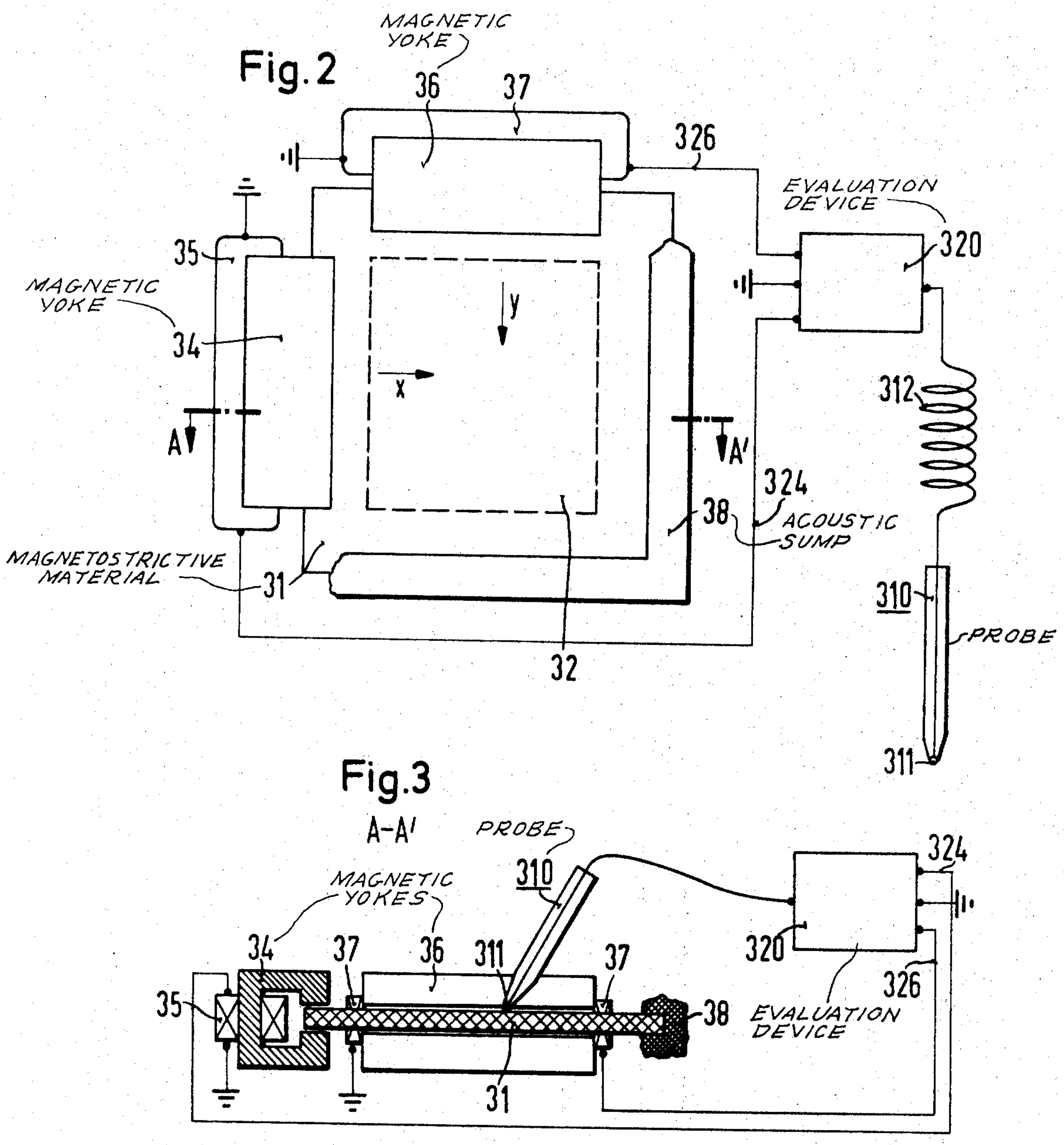
FIG. 2 is a diagrammatic view of a different form of the present invention, wherein the plate is made of magnetostrictive material with means for coupling the mechanical waves.
FIG. 3 is a diagrammatic view partly in section of the device showing FIG, 2 as taken along the line AA prime.

According to a further embodiment of the invention, a plate made of magnetostrictive material is provided in the place of a plate made of piezoelectric material. FIGS. 2 and 3 show such an arrangement. 31 is the plate of magnetostrictive material. It has a permanent magnetic polarization, preferably vertical to the surface of the plate. This magnetic polarization corresponds to the electric polarization of the plate 1 and causes a linear piezomagnetic effect.

At two nonparallel margins of the plate or a given surface 32 on the plate 31, means are arranged for coupling magnetic waves into the plate. These means essentially and preferably consist of a yoke 34 or 36, respectively, made of magnetic material, and an electric coil 35 or 37, respectively, which is wound around the yoke such that a magnetic excitation field occurs when current flows through these coils 35 or 37, respectively, in the air gap formed by the yoke 34 or 36, respectively, which contains the edge of the plate 31. The hereinbefore referred to principles and dimension rules and values as well as the stated results described in connection with FIG. 1 are true for the plate thickness, duration of the impulse, width of the alr gap, which take the place of the width of the electrodes 4 or 6, respectively.

Wave trains are produced in the material of the plate, extending in x- direction or in y- direction, respectively, by means of an impulse-shaped electromagnetic excitation. The plate is included in the range of the surface 32 by the wave trains of both passage directions and is available as a recording surface. 38 is an acoustic sump which corresponds to the sump 8 of FIG. 1.

The evaluation device, denoted by 320, is connected to the coils 35 and 37 by the connection lines 324 and 326. The sensing probe 310 having a sensing tip 311 is connected by a flexible line 312 to the evaluation device.

In an embodiment variation of the invention, with a magnetostrictive plate in which magnetic field changes occur due to the linear magnetostrictive effect; the sensing probe 310 has a small probe coil or a magnetic sensitive semiconductor element arranged at the tip of this sensing probe. Preferably, an additional soft magnetic core is provided for the coil or for the semiconductor element, respectively, for the concentration of the field lines emerging from the plate 31 at the place of the sensing tip of the probe.

When short wave trains are applied as described above, according to a further development of the invention, the power of resolution will be determined by the increase of the individual oscillation. As opposed thereto, the power of resolution with a wave package as mentioned with respect to the state of the art which consists of a number of periodic individual oscillations is given by the increase of the envelopment of the wave clusters. With the teaching according to the invention, an equally large power of resolution, compared with the state of the art, can be obtained with essentially lower frequency mechanical oscillations.

We claim as our invention:

1. A piezoelectric sensing device for continuously registering the location of a moving probe over a surface which comprises a plate of piezoelectric material having a surface over which the probe is to be selectively moved, said plate having a predetermined area with at least two edges angularly oriented with respect to each other, means for producing and coupling mechanical waves into said plate, these means being located on said edges on said surface area over which said probe is to be moved, electrode means substantially covering the underside of said plate, said probe having an electrode formed in its tip, said electrode in said tip and said electrode on the underside of said plate together forming a sensing pair, electronic circuit means for sequentially electrically pulsing said first mentioned means to provide mechanical wave motion in said plate, means for transmitting the electrical pulse signals picked up by said probe from said plate to a registering and storage device.

2. A device according to claim 1 in which an acoustic sump is provided at each edge of said plate opposite to said first mentioned means.

3. A device according to claim 1 in which the voltage pulses applied to said first mentioned means are rectangular voltage pulses having a duration between 0.2 and 1 /$\mu$sec.

4. A device according to claim 1 in which the piezoelectric material of said plate is lead zirconium titanate.

5. A device according to claim 1 in which said piezoelectric material of said plate is doped lead zirconium titanate.

6. A device according to claim 1, wherein said first mentioned means comprises third and fourth strip electrodes deposited on the surface of said plate opposite said underside electrode and extending along said edges, said underside electrode forming with said third and fourth electrodes two pairs of driving electrodes.

7. A device according to claim 6 in which the width of each of said third and fourth electrodes is approximately 1.0 mm.

8. A device according to claim 6 in which the said two edges are at right angles to each other.

9. A device according to claim 6 in which the width of each of said third and fourth electrodes is between 0.2 and 3.0 mm.

10. A device according to claim 6 in which said piezoelectric material plate has a thickness of 0.1 to 1.0 mm.

11. A device according to claim 6 in which said piezoelectric material plate has a thickness of approximately 0.3 mm.

12. A device according to claim 6 in which the width of each of said third and fourth electrodes is at least twice the thickness of said plate.

13. A device according to claim 6 in which said probe is in the form of a pen.

14. A device according to claim 6 in which said probe includes means for the capacitive reception of an electrical potential from the surface of the plate.

15. A device according to claim 6 in which an impedance matching transformer is provided between said probe and said registering device.

* * * * *